United States Patent [19]

Walker et al.

[11] Patent Number: 4,562,229

[45] Date of Patent: Dec. 31, 1985

[54] BLENDS OF POLYOLEFIN GRAFT POLYMERS AND SMA POLYMERS

[75] Inventors: Leigh E. Walker, Lewiston; Gautam R. Ranade, Grand Island, both of N.Y.

[73] Assignee: Occidental Chemical Corporation, Niagara Falls, N.Y.

[21] Appl. No.: 541,398

[22] Filed: Oct. 12, 1983

[51] Int. Cl.$^4$ .................... C08L 51/06; C08L 51/04; C08L 27/06

[52] U.S. Cl. ................................. 525/71; 525/74; 525/72

[58] Field of Search .................... 525/71, 74

[56] References Cited

U.S. PATENT DOCUMENTS

| | | | |
|---|---|---|---|
| 3,626,033 | 12/1971 | Keskkula et al. | 525/74 |
| 3,644,577 | 2/1972 | Lee et al. | 525/71 |
| 3,720,734 | 3/1973 | Kopacki et al. | 525/207 |
| 3,789,083 | 1/1974 | Dumoulin et al. | 260/878 |
| 3,790,644 | 2/1974 | Obsomer | 260/876 |
| 4,071,582 | 1/1978 | Takahashi | 525/310 |
| 4,206,291 | 6/1980 | Takahashi et al. | 525/167 |
| 4,311,806 | 1/1982 | DuFour | 525/71 |
| 4,329,272 | 5/1982 | DuFour | 524/288 |
| 4,454,300 | 6/1984 | Ranade et al. | 525/71 |
| 4,469,844 | 9/1984 | Doak | 525/71 |
| 4,469,845 | 9/1984 | Doak | 525/71 |

FOREIGN PATENT DOCUMENTS

| | | |
|---|---|---|
| 046650 | 3/1982 | European Pat. Off. . |
| 2304894 | 2/1973 | Fed. Rep. of Germany . |
| 1561586 | 2/1969 | France . |
| 58-91716 | 5/1983 | Japan . |
| 832700 | 4/1960 | United Kingdom . |
| 1158636 | 7/1969 | United Kingdom . |

*Primary Examiner*—Carman J. Seccuro
*Attorney, Agent, or Firm*—James F. Tao; James F. Mudd

[57] ABSTRACT

A novel thermoplastic polymer composition comprises a blend of a polyolefin graft copolymer, and a copolymer of styrene and maleic anhydride and modifications thereof.

14 Claims, No Drawings

BLENDS OF POLYOLEFIN GRAFT POLYMERS AND SMA POLYMERS

BACKGROUND OF THE INVENTION

The present invention relates to thermoplastic polymer blends capable of being molded into plastic articles with improved properties. The polyblends of the present invention contain a graft copolymer of a polymerizable polyolefin component. Such copolymers are hereinafter referred to as "polyolefin graft copolymers". In a preferred embodiment of the invention, the polymerizable monomer is a vinyl halide, such as vinyl chloride, and up to about 50 weight percent of another copolymerizable monomer. The preferred embodiments will be referred to as "vinyl halide-graft polyolefin polymers". The present blends also contain a polymer composition hereinafter referred to as "SMA polymers".

Polyvinyl halide, especially polyvinyl chloride, polymer are widely used thermoplastic materials having many favorable properties. Such conventional nongraft vinyl halide polymers do not have heat distortion temperatures which are sufficiently high to adapt such polymers to much more wide use. Moreover, such polymers, especially rigid polyvinyl halide polymers, do not have a high impact resistance at ambient or sub-ambient temperatures, i.e., at ambient temperature, i.e., at about 20° C., corresponding to about 68° F., the notched Izod impact resistance of vinyl haldide homo- and copolymers is only of the order of about 0.4 to less than about 1 ft-lb/in. At sub-ambient temperatures, e.g., down to −20° F. or lower, the notched Izod impact resistance of these polymers becomes vanishingly small or negligible.

It has been previously proposed to add minor amounts of an appropriate polymer additive, or additives, to improve ambient impact resistance of conventional polyvinyl polymer compositions. Usually, such additives are useful in ranges from about 3 to about 15 percent by weight of the polyvinyl halide polymer. Among the materials which have been found acceptable as polyvinyl halide impact modifiers are SMA polymers. Such impact modifiers moderately enhance the ambient temperature impact resistance of conventional vinyl halide polymers, i.e., generally raise the ambient temperature notched Izod impact resistance of the polymer to about 2 to 10 ft-lbs./in. However, these impact modifier are relatively ineffective in imparting a satisfactory sub-ambient temperature impact resistance to the polymer, i.e., the −20° F. notched Izod impact resistance of the polymer containing the impact aodifier is well below 1 ft-lb/in and usually is about 0.4 to 0.5 ft-lb/in.

Recently, vinyl halide-polyolefin graft copolymers have been developed to be a commercial reality. Such copolymer are produced by polymerization of vinyl halide (or a monomer mixture of vinyl halide and copolymerizable ethylenically unsaturated comonomers) in the presence of a polyolefin elastomer. Such reaction yields a polymer product which contains vinyl halide polymer chains bound, i.e., grafted at various sites along the chain of the trunk olefin polymer, as well as ungrafted vinyl halide polymer and ungrafted polyolefin. The graft polymer product, especially the graft polymer product prepared by a liquid phase bulk polymerization reaction, has improved impact resistance at both ambient temperature and sub-ambient temperatures compared to the aforementioned conventional, i.e., ungrafted, vinyl halide polymers even when the latter are blended with a conventional polyvinyl halide impact modifying polymer additive. The bulk polymerization-prepared graft polymer product is even distinguished from the corresponding graft polymer prepared by a non-bulk polymerization technique, e.g., suspension polymerization, by an enhanced impact resistance at both low and ambient temperature and by breakage by the desirable ductile breakage mode rather than by an undesirable brittle breakage mode.

Although such graft polymer possesses a sub-ambient low temperature impact resistance substantially greater than that of conventional impact modifier-containing vinyl halide polymer compositions, the improvement, especially at low temperature, in impact resistance is not sufficient enough to make such copolymers generally useful in a wide variety of applications at low temperature.

It has now been found that blends containing (1) a polyolefin graft polymer, prepared in a new way, especially vinyl halide polyolefin graft polymers, and more especially those produced in a mass polymerization reaction, and (2) SMA polymers have particularly useful properties.

The molar miscibility exhibited by the matrix phases of these polymeric components of the invention offers several advantages. The miscibility provides excellent mechanical compatibility. Superior weld line strengths and improved surface properties can be obtained when the polymeric components exhibit molecular miscibility. A problem of possible deterioration of the properties due to phase separation during or after processing may exist for an immiscible blend. This is likely in case of the injection molding process which typically uses very high shear rates. This problem is unlikely in a case where the polymeric components exhibit molecular miscibility.

SUMMARY OF THE INVENTION

The present invention relates to a thermoplastic polymer composition which is comprised of a blend of a polyolefin graft polymer and an SMA polymer. The polyolefin graft polymer is a polymer of an ethylenically unsaturated polymerizable monomer and a polymer of an olefin of 2 to about 8 carbon atoms, prepared in a process wherein the olefin polymer is substantially insoluble in the monomer, but is capable of absorbing the monomer.

Another aspect of the invention relates to a thermoplastic polymer composition which is comprised of a blend of a vinyl halide polyolefin graft polymer and an SMA polymer. The vinyl halide polyolefin graft polymer is a product of a solid polyolefin particle comprising a polymer of an olefin of 2 to about 8 carbon atoms, preferably a polyolefin of an aliphatic hydrocarbon olefin of 2 to about 8 carbon atoms with a vinyl halide monomer either alone or in combination with up to 50 percent by weight based on the total weight of monomer of an ethylenically unsaturated compound copolymerizable therewith. The olefin polymer is substantially insoluble in the monomer, but is capable of absorbing the monomer.

Both the polyolefin graft copolymer and the vinyl halide-polyolefin graft polymer are prepared by reacting polyolefins in a proportion of about 20 to about 80 weight percent based on the weight of the reactive monomer, although higher and lower proportions can be used. The preferred proportion is about 30 to about 50 weight percent of polyolefin based on weight of the monomer. The foregoing polyolefin graft polymers are advantageously prepared in a mass polymerization process, but can also be prepared in the presence of an inert diluent such as water.

By SMA polymer is meant a polymer of styrene and maleic anhydride, and such polymers that are modified by blending with or reaction with an olefin-diolefin modified polymer such as an ethylene propylene/polyene modified polymers as well as diolefin polymers such as polybuadiene. Such SMA polymers are found to exhibit molecular miscibility with the vinyl halide-polyolefin graft polymer.

The blends of this invention have beneficial properties when compared to prior art blends.

A further aspect of this invention involves blends of the foregoing polyolefin graft polymers, SMA polymers and graft polymers and copolymers of the polymerizable monomers that can form part of the polyolefin graft polymers. A preferred aspect of this invention involves blends of vinyl halide polyolefin graft polymers, SMA polymers and a polymer of a vinyl halide alone or copolymerized with a polymerizable monomer.

DETAILED DESCRIPTION OF THE INVENTION AND THE PREFERRED EMBODIMENTS THEREOF

Proportions of the SMA polymer in a binary blend with the polyolefin graft polymer, can range typically from less than about 1 percent to more than about 99 weight percent of SMA polymer (with the balance being the graft polymer component). It is preferred to provide blends which contain about 5 percent up to about 80 percent of the polyolefin graft polymer to achieve the desired enhanced properties. Preferred blends of this aspect of the invention contain about from about 5 percent to about 50 percent of the graft polymer component and from about 50 percent to about 95 percent of the SMA polymer component, said percentages being based on the weight of the blend of the graft polymer and the SMA polymer.

With respect to the aspect of the invention involving not only the graft polymer components and the SMA polymer component, but also an auxiliary polymer comprising a polymer or copolymer of an ethylenically unsaturated polymerizable monomer, the proportions of components are in the following ranges. The SMA polymer component is generally present in a proportion of about 20 percent to about 80 percent of the total polymer components, with the remainder being the polyolefin graft copolymer and the auxiliary polymer component. The latter two components are generally present in the proportion of about 10 parts polyolefin graft polymer to 90 parts auxiliary polymer to about 90 parts polyolefin graft polymer to 10 parts auxiliary polymer. The range is preferably from about 20 parts polyolefin graft polymer to 80 parts auxiliary polymer to 40 parts auxiliary polymer to about 30 parts polyolefin graft polymer to 60 parts auxiliary polymer. All parts and percentages are by weight.

THE POLYOLEFIN GRAFT POLYMER COMPONENT

The component of the polymer blends of the invention is a graft polymer of an ethylenically unsaturated polymerizable monomer and a polymer of an olefin of 2 to about 8 carbon atoms, wherein the olefin polymer is substantially insoluble in the monomer but is capable of absorbing the monomer. Such polymers, and the process for making them are described in copending application Ser. No. 541,191, filed on even date herewith, the disclosure of which is incorporated herein by reference.

Monomer Component

The novel graft polymers of the invention are prepared from one or more ethylenically unsaturated compounds that is polymerizable in the presence of a free-radical initiator. Suitable ethylenically unsaturated compounds which can be used are illustrated by the following compounds. Monoolefinic hydrocarbons, i.e., monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear alpha-alkyl or aryl substituted derivatives. e.g., o-, m- or p-methyl, ethyl, propyl or butyl styrene, alpha-methyl, ethyl, propyl or butyl styrene; phenyl styrene and halogenated styrenes such as alpha-chlorostyrene, monoolefinically unsaturated esters including vinyl esters, e.g., vinyl acetate, vinyl propionate, vinyl butyrate, vinyl stearate, vinyl benzoate, vinyl-p-chlorobenzoates, alkyl methacrylates, e.g., methyl, ethyl, propyl, butyl, octyl and lauryl methacrylate; alkyl crotonates, e.g., octyl; alkyl acrylates, e.g., methyl, ethyl, propyl, butyl, 2-ethyl hexyl, stearyl, hydroxyether and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate vinyl alpha-chloropropionate and vinyl alpha-bromopropionate; allyl and methallyl compounds, e.g., allyl chloride, allyl alcohol, allyl cyanide, allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g. methyl alpha-chloroacrylate and ethyl alpha-chloroacrylate, methyl alpha-bromoacrylate, ethyl alpha-bromoacrylate, methyl alpha-fluoroacrylate, ethyl alpha-fluoroacrylate, methyl alpha-iodoacrylate, ethyl alpha-iodoacrylate; alkyl alpha-cyanoacrylates, e.g., methyl alpha-cyanoacrylate and ethyl alpha-cyanoacrylate and alkyl alpha-cyanoacrylates, e.g., methyl alpha-cyanoacrylate and ethyl alpha-cyanoacrylate, maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, famaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl-2-chloroethyl ether, vinyl propyl ether, vinyl n-butyl ether, vinyl isobutyl ether, vinyl 2-ethylhexyl ether, vinyl 2-chloroethyl ether, vinyl cetyl ether and the like; and vinyl sulfides, e.g., vinyl betachloroethyl sulfide vinyl betaethoxyethyl sulfide and the like can also be included as can diolefinically unsaturated hydrocarbons containing two olefinic groups in conjugated relation and the halogen derivatives thereof, e.g., butadiene-1,3, 2-methylbutadiene-1,3, 2,3-dimethylbutadiene-1,3; 2-methylbutadiene-1,3 2,3-dimethyl-butadiene1,3; 2-chlorobutadiene-1,3. 2-3-dichloro-butadiene-1,3, and 2-bromobutadiene-1,3 and the like. Mixtures of the foregoing compounds can also be employed.

Particularly useful monomer compositions include styrene, methyl methacrylate, methyl acrylate, vinyl acetate, mixtures of styrene and acrylonitrile, and mixtures of styrene and various maleates.

In one aspect of the invention, the preferred monomer composition is comprised totally of a vinyl halide monomer. Suitable vinyl halide monomers useful in the invention are the alpha-halo-substituted ethylenically unsaturated compounds which are capable of entering into an addition polymerization reaction, for example vinyl monohalides such as vinyl fluoride, vinyl chloride, vinyl bromide, and vinyl iodide, as well as vinyl dihalides such as vinylidene fluoride, vinylidene chloride, vinylidene bromide, and vinylidene iodide and the like, although vinyl chloride is preferred.

While it is preferred that the monomer composition be comprised totally of vinyl halide monomer as described above, the present invention is also intended to include copolymers formed by the free-radical addition polymerization of a monomer composition containing a predominant amount, e.g. at least 50 percent of vinyl halide with the remainder being another ethylenically unsaturated monomer composition copolymerizable therewith. Preferably, the other ethylenically unsaturated monomer is used in amounts of 20 percent or less by weight and more preferably in amounts of 10 percent or less by weight of the total monomer used in preparing the polymer.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention includes all such combinations.

Polyolefin Component

The polyolefin component of the invention is characterized by being substantially insoluble in the reactive monomer component, and it remains insoluble during the polymerization reaction. The polyolefin is also capable of absorbing the reactive monomer component. When the proportion of polyolefin in the reaction mixture is at least about 20 weight percent of the reactive components, essentially all of the monomer component is absorbed into the particles of polyolefin component where the reaction occurs.

Generally, the polyolefin is capable of absorbing monomer to the extent of at least about 10 weight percent of the weight of polyolefin, usually at least about 25 weight percent and more usually at least about 100 weight percent of the weight of polyolefin. Generally, the polyolefin can absorb monomer up to 10 times the weight of polyolefin, more usually up to about 400 weight percent and still more usually up to 300 weight percent of the weight of polyolefin. The polyolefin may swell in the presence of the monomer. But the polyolefin remains as a free flowing particle that does not agglomerate or fuse.

The preferred polyolefins are prepared from unsubstituted aliphatic hydrocarbon monoolefins, including straight chain and branched chain compounds such as ethylene, propylene and butene-1, isobutene, pentene, hexene, heptane, octene, 2-methylpropene-1, 3-methylbutene-1, 4-methylpentene-1, 4-methylhexene-1, and 5-methylhexene-1.

The polyolefin also preferably contains an unsubstituted, aliphatic hydrocarbon polyene, such as diene or triene, as a monomer unit. Generally polyenes of from 5 to 18 carbon atoms are employed.

Suitable comonomers for preparing the polyolefins are those utilized to prepare homopolymers as listed above such as propene or butene-1 with ethene or isobutylene with isoprene and the like. Suitable termonomers are those utilized to prepare homopolymers and copolymers as disclosed above such as propene, ethene and the like containing up to 15 percent, preferably up to about 10 percent by weight of polyene, for example, a diene such as dicyclopentadiene, 1,3-butadiene, 1-5-cyclooctadiene, 2-ethylidene-norbornene-5, 1,4-hexadiene, 1,4-heptadiene, and other conjugated and especially nonconjugated dienes with linear or cyclic chains.

Trienes such as isopropylidene cyclopentadiene and the Diels-Alder mono- and di- adducts thereof with cyclopentadiene can be used in place of the diene.

Unsubstituted, aliphatic diolefins can also be used for preparing useful polyolefins such as butadiene, isoprene, octadiene, and the like. Especially useful are the various forms of polybutadiene, such as made in emulsion, suspension or solution processes, and random, block, and star block polymers with monomers such as styrene.

Various other polyolefins that contain other than hydrogen and carbon can also be employed as long as they meet the criteria of being insoluble in the reactive monomer and capable of absorbing that monomer. Such polyolefins are generally polymers of substituted, aliphatic hydrocarbon olefins of 2 to about 8 carbon atoms, and are more particularly polymers of an unsubstituted, aliphatic hydrocarbon olefin of 2 to about 8 carbon atoms and a substituted aliphatic hydrocarbon olefin of 2 to about 8 carbon atoms. Suitable substituted hydrocarbon olefins include vinyl acetate, vinyl benzoate, and other vinyl esters with organic acids and haloacids, isopropenyl acetate and other esters, methyl methacrylate and other alkyl methacrylates, methyl acrylate, ethyl acrylate and other alkyl acrylates, and olefins. Included in such additional polyolefins are olefin-vinyl acetate copolymers, such as ethylene-vinyl acetate copolymers; olefinacrylate copolymers, such as ethylene-acrylate copolymers; polychlorobutadiene, and the like.

Suitable polyolefin components include the above described homopolymers, copolymers or terpolymers, but can also include blends of two or more polyolefins that may not meet the criteria in themselves, but the blended composition is insoluble in the reactive monomer but capable of absorbing the reactive monomer. Thus, certain ethylene propylene diene modified polymers (EPDM) are soluble in vinyl chloride monomer, and hence are not suitable when used alone in the process of the invention. High density polyethylene (HDPE) is insoluble in vinyl chloride monomer, but does not absorb that monomer, and hence is not suitable when used alone in the process of the invention. However, it is found that mixtures of ethylene propylene diene modified polymers and high density polyethylene when melt blended are highly desirable in the process of the invention. The higher the ethylene content of the EPDM, the lower the amount of HDPE required. Particularly suitable are HDPE's having a melt index of 0.1 to 50, blended with a polyolefin, for example, EPDM at a ratio of from 1 to 20 to 20 to 1.

Low density polyethylene is found to be both insoluble in vinyl chloride monomer and capable of absorbing that monomer, and is useful in the process of the invention. The very low density polyethylene waxes, on the other hand, are soluble in vinyl chloride monomer and hence are not suitable when used alone in the process of the invention. Other useful blends of polyolefins include blends of polybutadiene and high density polyethylene. Very high molecular weight polymers, e.g. polybutadiene of weight average molecular weight of over 1,000,000, or ethylene propylene copolymer of weight average molecular weight over 300,000, function in this manner without blending in reactions where their lower homologs may need to be blended to meet the nonsolubility requirement. A given blend or polymer may perform with one monomer where the insolubility requirement is met, but not in another where it dissolves, or partially dissolves. The former would be considered to be within the scope of the invention whereas the latter would not.

The polyolefin used in the invention is in particulate form. The particles may be pellets, such as formed by extrusion through an orifice and cutting into pellets by a dicer. The particles can also be formed as pellets in a pellet forming device. The polyolefin is generally in the form of particles measuring in the range of about 1 to about 5 millimeters, preferably about 1 to about 3 millimeters. Other particle sizes can be used. The particles can be of various shapes, uniform such as beading cylinders, pill shaped, as well as in irregular shapes resulting from grinding.

Reaction Conditions

The polyolefin graft polymer component of the invention is preferably prepared in a mass polymerization process wherein solid discrete particles or pellets of solid polyolefin are mixed with a monomer component in the liquid state and a free-radical initiator compound at ambient temperatures. All or part of the mixture of monomer and initiator compound is absorbed into the solid polyolefin particles. It is preferred to put all the monomer into the reactor with the polyolefin at the beginning of the reaction. However, the monomer can be added incrementally during the reaction. As indicated hereinbefore, the monomer can be reacted with the polyolefin in steps to achieve the desired product. Generally only sufficient monomer is introduced at one time to the polyolefin to avoid the formation of powdered polymer, except, of course, in the aspect of the invention where co-manufacture of particles of graft polymer and powdered homopolymer or copolymer is desired. When operating in the stepwise embodiment, the amount of monomer added in the second and subsequent steps does not usually exceed the ratio of monomer to polyolefin established in the first step of the sequence.

The reaction mixture is heated to a temperature in the range of about 30 to about 90 degrees Celsius, preferably in the range of about 40 to about 75 degrees Celsius, more preferably in the range of about 60 to about 70 degrees Celsius, and the reaction is allowed to proceed to the desired conversion of monomer, generally in the range of about 30 to 90 percent conversion, preferably about 50 to 80 percent conversion, and more preferably about 60 to 75 percent conversion. Thereafter, the unreacted monomer component is removed from the reaction mixture by suitable degassing techniques such as by direct degassing, by drawing a vacuum on the reaction product, by washing with water or a solvent or by steam distillation. The solid reaction product is withdrawn from the reaction vessel as the product of the process.

Initiators

Suitable initiator compounds for use in the process of the invention include organic or inorganic peroxides, persulfates, ozonides, hydroperoxides, peracids and percarbonates, azo compounds, diazonium salts, diazotates, peroxysulfonates, trialkyl borane-oxygen systems, and amine oxides. Suitable initiators are soluble in the organic phase, such as peroxides: benzoyl peroxide, capryl peroxide, lauroyl peroxide, 2,4-dichlorobenzoyl peroxide, diacetyl peroxide, and acetyl cyclohexylsulfonyl peroxide; azo compounds: azobisiobutyronitrile, azobis(alpha-methylgammacarboxybutyronitrile), azobis(alphagamma-dimethylvaleronitrile), 2,2'-azobis(2,4-dimethylvaleronitrile), peroxydicarbonates: diisopropyl peroxydicarbonate di-sec-butyl peroxydicarbonate, and dicyclohexylperoxydicarbonate, azobisiobutyramidine hydrochloride, and peresters: t-butyl peroxypivalate and t-butyl peroxyneodecanoate. Peroxydicarbonates, peresters and peroxides are particularly useful in the present invention. The initiator is used in concentration ranging from about 0.01 to about one percent by weight, preferably about 0.1 to about 0.5 percent by weight, based on the total weight of the monomers. Other amounts can be used.

Diluents

Various diluents may be used in the process of the invention as long as they are not reactive with the products of the invention and do not dissolve the products of the invention, which would partially defeat many of the virtues of the process. The most common diluent is water, which may be used without any suspending or emulsifying agent. Essentially, when water is used as the diluent, the particles of solid polyolefin float in the water phase and during the reaction process are dispersed through the water phase by suitable agitation.

Other diluents include organic compounds such as saturated hydrocarbons having from about 3 to about 15 carbon atoms per molecule. Preferably, the diluent is a straight or branched chain, or cyclic saturated hydrocarbon having from 3 to 15 carbon atoms, and more preferably, from 4 to 8 carbon atoms. Alcohols of 1 to 15 carbon atoms can also be employed.

Illustrative examples of suitable diluents which can be employed in the present process include n-propane, n-butane, isobutane, isopentane, neopentane, 2-methyl pentane, 3-methyl pentane, 2,2-trimethyl pentane, 2,2,3-trimethyl pentane, n-tridecane and n-pentadecane. Mixtures of these and other hydrocarbon alkanes, as well as cycloalkanes, such as cyclohexane and methyl cyclopropane, can be used also. Useful alcohols include ethyl, isopropyl, butyl, isobutyl, octyl, dodecyl alcohol, ethylene glycol, propylene glycol, 1,3-dihydroxypropane, and the like.

The diluents can enter the polyolefin particle as in the case of hydrocarbons, or may stay out as in the case of water, or may do both.

Chain Transfer Agents

Chain transfer agents can be used in the process of the invention to adjust the molecular weight of the polymer of the unsaturated monomer, such as PVC. The polyolefin component itself is found to serve as a chain transfer agent by changing the molecular weight of the PVC produced in the case of vinyl chloride monomer. Other transfer agents that can be used include aldehydes, mercaptans such as mercaptoethanol, dodecylmercaptan; chloroolefins such as perchloroethylene, trichloroethylene, halomethanes such as bromoform, olefins, substituted isopropyl compounds, thiotin compounds, such as alkyltin mercaptoacetate esters and the like.

THE SMA POLYMER COMPONENT

The SMA polymer is a copolymer of styrene and maleic anhydride, optionally modified with other monomers and polymers. Thus the styrene and maleic anhydride can be co-reacted with monomers, such as methyl methacrylate, or polymers, such as polybutadiene. The co-reacted polymers can be blended with other polymers such as ABS polymers (graft copolymer of acrylonitrile and styrene with polybutadiene and blends of acrylonitrile butadiene copolymer with styrene acrylonitrile copolymer).

Suitable SMA polymers are disclosed in U.S. Pat. No. 3,509,110, disclosure of which is incorporated herein by reference. While the patent is directed to a particular process for making the SMA polymer, the patent is appropriate for disclosing the basic SMA polymer composition. Thus, the SMA polymers, basically comprise a copolymer of a vinyl aryl monomer and an ethylenically unsaturated dicarboxylic acid. As shown in the patent the polymer may be formed by reacting the vinyl aryl monomer with a half ester of an ethylenically unsaturated dicarboxylic acid.

Aryl vinyl monomers useful in the making of the SMA polymers include styrene, ortho-methylstyrene, meta-methylstyrene, para-methylstyrene, ethylstyrene, dimethylstyrene, divinylbenzene, alpha-methylstyrene, para-methoxystyrene, para-chlorostyrene, 2,4-dichlorostyrene, 2,5-dichlorostyrene parabromostyrene, alpha-methyl-p-methylstyrene, para-isopropylstyrene, vinylnaphthalene and the like. Mixtures of two or more of these aryl vinyl monomers may be used if desired.

The half esters of an ethylenically unsaturated dicarboxylic acid are prepared from the following acids: maleic acid, fumaric acid, itaconic acid, citraconic acid, mesaconic acid, ethyl maleic acid, methyl itaconic acid, chloromaleic acid, dichloro-maleic acid, bromomaleic acid, dibromomaleic acid and the like.

The half esters are formed from the ethylenically unsaturated dicarboxylic acid or its anhydride (or mixtures of the same) and the desired alcohol. Suitable alcohols are the primary and secondary alkanols containing up to 6 carbon atoms, such as methyl, alcohol, ethyl alcohol, n-propyl alcohol, n-butyl alcohol, sec-butyl alcohol and n-pentyl alcohol; halogenated alkanols having up to 6 carbon atoms, such as 2,3-dichloro-1-propanol and 2-bromo-1-propanol; arylakyl alcohols such as benzyl alcohol; eyelic alcohols having up to 6 carbon atoms, such as cyclopentanol, cyclohexanol and tetrahydrofurfuryl alcohol; ether alcohols such as 2-butoxy ethanol and the ethyl ether of diethylene glycol; phosphorous containing alcohols such as diethyl monobutanol phosphate; nitrogen containing alcohols such as N-N-dimethyl ethanol amine, and the like.

The aryl vinyl monomer and ester of an ethylenically unsaturated dicarboxylic acid or anhydride are reacted in the proportion of about 50 to 95 weight percent monovinyl aromatic compound with the remainder being acid or anhydride.

Other suitable SMA polymers are prepared in accordance with U.S. Pat. No. 4,278,768, the disclosure of which is incorporated herein by reference. This patent teaches that SMA polymers can be prepared by direct copolymerization of a monovinyl aromatic monomer with an ethylenically unsaturated dicarboxylic acid anhydride by continuous controlled addition of the more reactive anhydride monomer to produce the copolymer of the desired composition.

The monovinyl aromatic monomers useful in the copolymers are styrene, alpha-methylstyrene, nuclear-methylstyrenes, ethylstyrene, isopropylstyrene, tertbutylstyrene, chlorostyrenes, dichlorostyrenes, vinylnaphthalene and mixtures of these.

Suitable anhydrides are the anhydrides of maleic acid fumaric acid, itaconic acid, citraconic acid, mesaconic acid, ethyl maleic acid, methyl itaconic acid, chloromaleic acid, dichloromaleic acid, bromomaleic acid, dibromomaleic acid, and mixtures thereof and the like.

The anhydride copolymers may contain from 5 to 50 mole percent of anhydride and 95 to 50 mole percent of monovinyl aromatic monomer.

For the rubber-modified copolymers, the starting copolymers may be any of the above anhydride copolymers into which 5 to 40 percent by weight of one of the known rubbers has been incorporated. The rubbers may be incorporated into the anhydride copolymers by blending, mixing, or copolymerizing the monomers in the presence of the rubber. A method of preparing the rubber-modified anhydride copolymer is that taught in U.S. Pat. No. 3,919,345, wherein a rubber is dissolved in monovinyl aromatic monomer, polymerization initiated and ethylenically unsaturated dicarboxylic acid anhydride is added continuously to the polymerizing mixture at a rate sufficient to maintain the concentration of anhydride low.

Suitable rubbers, or elastomers, include conjugated 1,3-diene rubbers, styrene-diene copolymer rubbers, acrylonitrile-diene copolymer rubbers, ethylene-propylene-diene terpolymer rubbers, acrylate-diene copolymer rubbers, and mixtures thereof.

Preferred rubbers are diene rubbers such as homopolymers of conjugated dienes such as butadiene, isoprene, chloroprene, and piperylene and copolymers of such dienes with up to 50 mole percent of one or more copolymerizable mono-ethylenically unsaturated monomers, such as styrene, substituted styrenes, acrylonitrile, methacrylonitrile and isobutylene.

Other suitable SMA polymers are prepared as described in U.S. Pat. No. 4,311,806, the disclosure of which is incorporated herein by reference. This patent teaches rubber-modified copolymers of a vinyl aryl monomer and unsaturated dicarboxylic acid anhydride. The basic polymer may also include a termonomer selected from acrylates and methacrylates and unsaturated nitriles wherein the relative proportion of monomers are 50 to 85 percent of the vinyl aryl monomer. 15 to 30 percent of the anhydride and 0 to 20 percent of the termonomer wherein the monomers are polymerized in the presence of 5 to 25 percent by weight of a rubber having a glass transition temperature below 0° C. The patentees also provide for blending such SMA polymers with graft copolymer of from 20 to 40 percent by weight of a monomer selected from the group comprising methyl methacrylate and acrylonitirle and 80 to 60% by weight of a vinyl aromatic monomer said copolymer being grafted onto from 10 to 60%, based on the weight of the composition, of a substrate rubber having a glass transition temperature below 0° C.

Styrene is preferably used in forming these polymers, but the styrene can be replaced in whole or in part by other vinylaromatic monomers such a-methyl styrene, chlorostyrene, bromostyrene, p-methyl styrene and vinyl toluene. Similarly the maleic anhydride can be replaced in whole or in part by another unsaturated dicarboxylic anhydride such as itaconic, aconitic or citraconic anhydride. The termonomer, where present is most preferably methyl methacrylate.

The proportions of the monomers preferably employed give an anhydride content of from 20 to 30% and a methyl methacrylate content of 5 to 15%.

The SMA polymer comprises 5 to 25% by weight of the rubber component and preferably from 10 to 25% by weight.

The rubber is conventionally a diene rubber such as polybutadiene or a butadiene based block or radial-block rubber. Other rubbers such as EPDM rubber, polypentenamer, polyisoprene, polychloroprene, polyacrylate rubbers and the like can, if desired, also be used.

Rubber modified copolymers are prepared by polymerizing the monomers in the presence of the rubber in such a way that a uniform copolymer of the polymerizing monomers is grafted on to the rubber substrate and a matrix copolymer of essentially the same composition as the graft copolymer is simultaneously generated. Suitable methods of producing such rubber modified copolymers are well known in the art and a typical process is described in U.S. Pat. No. 3,919,354.

The optional additional polymer component used with the SMA polymer is typically an ABS or MBS type polymer, that is to say, a diene rubber substrate grafted with styrene and either acrylonitrile, methyl methacrylate or a mixture of these monomers. However the rubber need not be the conventional polybutadiene or butadiene/styrene copolymer since any rubber with a glass transition temperature below 0° C. can be used. Such rubbers include those which may provide the substrate for the SMA polymer described above.

The presence of the optional additional polymer components confers additional benefits in terms of impact strength and modulus so that the inclusion of from 10 to 35% by weight of the component in the polyblends of the invention is a preferred feature.

AUXILIARY POLYMER COMPONENT

In addition to binary blends of the polyolefin graft polymer component and the SMA polymer component, highly useful compositions can be proposed by blending in as an auxiliary component, a polymer or copolymer of an ethylenically unsaturated polymerizable compound. Such polymerizable compounds use any of those disclosed hereinabove for preparation of the polyolefin graft polymers.

When the polyolefin graft polymer is a vinyl halide polyolefin graft polymer, it is highly desirable for the auxiliary polymer component to be a vinyl halide homopolymer or copolymer with a copolymerizable ethylenically unsaturated monomer. The vinyl halide monomers and the comonomers are any of those described hereinbefore.

OPTIONAL ADDITIVES

The compositions of the invention can also contain various functional additives which additives are conventional in the preparation of polymer molding compositions. Typically, these additives include thermal and/or light stabilizers as well as external and internal lubricants and processing aids for the polyolefin graft polymer component and the other polymers of the blends of the invention.

Stabilizers suitable for use in making the polymer compositions of the invention include materials known to stabilize the polymer components against the degradation action of heat and/or light. They include known stabilizers, both organic and inorganic, such as metal salts of mineral acids, salts of organic carboxylic acids, e.g., carboxylic acids of 6 to 18 carbon atoms, organo-tin compounds, epoxides, amine compounds and organic phosphites. Conveniently, an organo-tin compound, such as a methyl tin mercaptide, is employed as a stabilizer.

A more detailed description of suitable stabilizers, lubricants and processing aids for incorporation into the compositions of the invention is presented in U.S. Pat. No. 4,319,002, the disclosure of which is incorporated herein by reference.

Additional classes of additives known for use in polymers which can be added optionally to the compositions of the invention in addition to the aforementioned stabilizers, lubricants and processing aids include pigment, dyes and fillers as described in L. R. Brecker, *Plastics Engineering,* March 1976, "Additives 76", pages 3–4, the disclosure of which is incorporated herein by reference.

In general the amount of each type of the aforementioned optional additive employed in the present composition is about 0.01 to about 5 weight percent, preferably about 0.1 to about 3 weight percent, based on the total resin composition.

When the compositions of the invention contain vinyl halide polymer components, tney are essentially of the rigid vinyl halide resin type which contain no more than about 10 weight percent of a plasticizer for vinyl halide grade polymer and preferably are free of said plasticizing additive. Typical suitable plasticizer additives (which are generally organic compounds) conventionally employed in polyvinyl halide compositions include, for example, the esters of aliphatic alcohols of medium chain length, of 7 to about 11 carbon atoms, with phenyl dicarboxylic acids, such as di-n-octyl phthalate and di-iso-nonyl phthalate as well as organic phosphate esters, such as cresyl-diphenyl-phosphate and octyl diphenyl-phosphate. The chemical structure and technology of plasticizers conventionally employed in polyvinyl halide compositions is more particularly discussed in L. R. Brecker, op. cit. page 5, the disclosure of which is incorporated herein by reference.

PREPARATION OF BLENDS

The compositions of the invention can be prepared by conventional milling and molding techniques. Generally, the component polymers (and, if desired, the above-described optional additives) are added as a particulate solid mixture to a roll mill or a Banbury type mixer and milled at an elevated temperature conventional for processing rigid vinyl halide polymer compositions. The resultant polymer blend obtained as a product from the milling and mixing operation is molded by either an injection or compression molding technique or extruded to produce articles of particular desired shapes at elevated temperature and pressure conditions which are conventional in olding rigid polyvinyl halide compositions. Desirably an injection molding technique is employed to prepare the aforementioned articles which can be in various shapes including bars, plates, rings, rods, as well as sheets and films. Physical or chemical blowing agents can also be added to the molding compounds according to the invention in order to produce a foam structure under suitable operating conditions.

In addition to the above mentioned other additives, other polymeric materials can be blended with the blend compositions of this invention.

THE EXAMPLES

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

In the following examples, blends were prepared of the following polymer components.

Vinyl Polymer A

In a 5 gallon stainless steel reactor equipped with a helical up-pumping agitator, was charged 4 pounds of a commercially pelletized blend of polyolefins containing approximately 85 weight percent of an EPDM elastomer having a molar ratio of ethylene to propylene of about 72 percent to 28 percent, and 3 double bonds of unsaturation as 1,4-hexadiene per 1,000 carbon to carbon bonds (db/1,000 C-C) of approximately 170,000 weight average molecular weight with about 15 weight percent high density polyethylene. The particle size of the pelletized blend was about 3 mm in diameter by 1.5 mm in thickness. The vessel was pressurized with nitrogen to 180 psig and evacuated. Nine ml of a solution of 0.5 ml of a 75% solution of the t-butyl peroxy neodecanoate in mineral spirits (free radical initiator) and 12 pounds of vinyl chloride containing 5% isobutane were charged and the agitator was operated at 40 rpm and the jacket heated at 60° C. The pressure gradually increased to a maximum of 155 psig, and then fell. The reaction was allowed to proceed for 4 hours and then the unreacted monomer was recovered. Then 18 ml of a butyltin mercaptoacetate ester were added with 3 lb. of VCM. The mixture was heated and stirred for 20 minutes. The unreacted monomer was recovered. The product was degassed under vacuum at 80° C. for 2.5 hours. The yield of white pellets was 11.5 pounds with a calculated polyolefin content of 35%. It was estimated that the product contained at least 21% polyolefin in the grafted form.

Vinyl Polymer B

In a still larger preparation than used in preparing Vinyl Polymer A, 2,000 lbs. of the polyolefin used to make Vinyl Polymer A, were charged to a reactor and heated initially at 60° followed by cooling the jacket to maintain a maximum internal pressure of 150 psig. The reaction was carried out for 2.5 hrs. followed by degassing, etc. The recovered product 6,300 lb. has a calculated polyolefin content of 31.5%. The isolated product was 99+% in the form of free flowing pellets. Only small amounts of powder (0.5%) and agglomerated pellet and scale (0.3%) were observed in the product.

SMA Polymers I and II

The impact modified copolymers of styrene and maleic anhydride sold commercially as Cadon 112 and Cadon 127 by Monsanto shall be referred to herein as SMA Polymers I and II, respectively. These polymers are prepared according to U.S. Pat. No. 4,223,096. These impact modified compositions are also described in U.S. Pat. No. 4,311,806.

SMA Polymer III

An impact modified copolymer of styrene and maleic anhydride sold commercially as Dylark-700 by Atlantic Richfield Company. Dylark-700 contains about 83 weight percent styrene, 7.5 weight percent maleic anhydride and 9.1 weight percent polybutadiene.

SMA Polymer IV and V

The copolymers of styrene-maleic anhydride sold commercially as Dylark-232 and Dylark-332 by Atlantic Richfield Company shall be referred to herein as SMA Polymers IV and V respectively. Dylark-232 contains about 72 weight percent styrene and 8 weight percent maleic anhydride. Dylark-332 contains about 86 weight percent styrene and about 14 weight percent maleic anhydride.

All polymers used in these examples were dryed before preparing the blends. The blends were prepared on a two-roll Farrell mill heated using a hot oil system. A front roll temperature of 360° F. and a back roll temperature of 340° was used. The milling time was kept to a minimum necessary for obtaining good mixing, normally about 4 to 5 minutes. Due care was taken to obtain a good lateral mixing on the mill. The blend was removed from the mill in the form of a sheet and quickly cut into small pieces. These pieces were coarse ground after cooling. The injection molded tensile and flexural bars were used for evaluating mechanical properties. The injection molding of samples having appropriate ASTM configurations was carried out using an Arburg injection molding machine (Model 221E-150). Table 1 shows the details of the testing procedures used to obtain various properties.

TABLE 1

| Property/Data | ASTM Method | Instrument Used | Number of Samples | Type of Sample | Comments |
|---|---|---|---|---|---|
| Summary of Testing and Characterization Methods | | | | | |
| Tensile Properties Modulus Strength (Yield) Elongation (Yield) | D638 | Instron- Model TTC | 5 | Injection Molded Std dog bone shape Tensile bar. (⅛" × ½" 6½") | Strain rate of 0.2"/minute |
| Izod Impact | D256 | Izod Impact | 3 | Injection Molded | Three bars tested at both sprue and |

TABLE 1-continued
Summary of Testing and Characterization Methods

| Property/Data | ASTM Method | Instrument Used | Number of Samples | Type of Sample | Comments |
|---|---|---|---|---|---|
| Room Temperature (23 3° C.) or Low Temperature (−28.8° C.) | | Tester | | Flex Bars (½" × ⅛" × 5") | vent ends. All samples were notched using standard size. |
| Specific Gravity | D792 | Standard Balance | 2 | Injection Molded Bar | Calculated from weight loss of the sample after immersing in distilled water. |
| Heat Distortion Temperature | D648 | Standard Heat Deflection Bath | 2 | Injection Molded Flex Bar (½" × ⅛"/5") | Tested at 264 psi. Sample immersed in silicone. Bath heated at 2° C./min. Sample bar tested edgewise. Two different conditioning methods used for each composition: (a) 48 hours at 50° C. (b) 24 hours at 70° C. |
| Flexural Properties Modulus Strength (Yield) Strain (Yield) | D790 | Instron Model-TMS | 5 | Injection Molded Flexural Bar (½" × ⅛" × 5") | Cross head speed of 0.5" per minute |

EXAMPLES 1-2

A blend of a commercial injection molding grade of PVC resin sold by Occidental Chemical Corporation under the name B-221, SMA Polymer I and Vinyl Polymer B was prepared using the above described procedures. Also a blend of the same PVC resin and SMA Polymer III and Vinyl Polymer B was prepared. The proportions of the components in these blends are shown in Table 2. These blends were tested according to the procedures listed in Table 1. The results of these tests are shown in Table 2.

TABLE 2

| | Example 1 Vinyl Polymer* SMA Polymer I (60:40) | Example 2 Vinyl Polymer* SMA Polymer III (40:60) |
|---|---|---|
| Mechanical Properties | | |
| Tensile Strength psi × 10 | 5.06 | 5.56 |
| Tensile Modulus psi × 10 | 3.05 | 3.14 |
| Elongation % | 2.63 | 2.84 |
| Notched Izod Impact at 23.3° C. ft-lb/in | 4.7 | 14.8 |
| Notched Izod Impact at −28.8° C. ft-lb/in | 1.1 | 1.76 |
| Flexural Strength psi × 10 | 9.99 | 10.53 |
| Flexural Modulus psi × 10 | 3.36 | 3.4 |
| Percent Strain | 4.19 | 4.67 |
| Rockwell Hardness | R-89 | R-95 |
| Shore Durometer Hardness | D-77 | D-77 |
| Mold Shrinkage in/in | 0.0044 | 0.0046 |
| Specific Gravity | 1.14 | 1.2 |
| Thermal Properties | | |
| Heat Distortion Temperature (264 psi) °C. | 80 | 73 |
| Heat Distortion Temperature (annealed) °C. | 89 | 79 |
| UL-94 Rating | | |
| ⅛" Thickness | V-1 | NC |
| 1/16" Thickness | V-1 | NC |
| Brabender Torque Rheometer Data | | |
| Fusion Time (seconds) | 19.8 | 16.2 |
| Maximum Fusion Torque (meter-grams) | 5200 | 4300 |
| Equilibrium Torque (meter-grams) | 950 | 1000 |
| Decomposition Time (minutes) | 9.0 | 16.3 |

*Weight Ratio of PVC to Vinyl Polymer B = 60:40

EXAMPLES 3-8

Blends of Vinyl Polymer B, PVC resin B-221 and SMA Polymer I were prepared in various proportions. These proportions are indicated in Table 3. The notched izod impact strengths and heat distortion temperatures of these blends were tested according to the procedures described in Table 1. The results of these tests are given in Table 3.

TABLE 3

| Example No. | Composition Vinyl Polymer*:SMA Polymer I | Notched Izod Impact Strength at 23.3° C. ft-lb/inch | −28.8° C. | Heat Distortion Temperature annealed (264 psi) 48 Hrs. at 50° C. (24 Hrs. at 70° C.) °C. |
|---|---|---|---|---|
| 3 | 100:0 | 23.3 | 1.14 | 68 (68) |
| 4 | 80:20 | 20.2 | 1.22 | 71 (76) |
| 5 | 60:40 | 15.7 | 1.68 | 73 (80) |
| 6 | 40:60 | 12.2 | 1.93 | 78 (87) |

TABLE 3-continued

| Example No. | Composition Vinyl Polymer*:SMA Polymer I | Notched Izod Impact Strength at | | Heat Distortion Temperature annealed (264 psi) 48 Hrs. at 50° C. (24 Hrs. at 70° C.) °C. | |
|---|---|---|---|---|---|
| | | 23.3° C. ft-lb/inch | −28.8° C. | | |
| 7 | 20:80 | 7.2 | 1.55 | 86 | (95) |
| 8 | 0:100 | 5.4 | 1.4 | 89.8 | (97) |

*Weight Ratio of PVC to Vinyl Polymer B = 60:40

EXAMPLES 9-14

Blends of Vinyl Polymer B, B-221 PVC resin (Occidental Chemical Corporation) and SMA Polymer II were prepared in various proportions indicated in Table 4 using the above described procedures. The properties of these blends were measured according to previously described procedures in Table 1. The results of these tests are listed in Table 4.

TABLE 4

| Example No. | Composition Vinyl Polymer:SMA Polymer II | Notched Izod Impact Strength at | | Heat Distortion Temperature annealed (264 psi) 48 Hrs. at 50° C. (24 Hrs. at 70° C.) °C. | |
|---|---|---|---|---|---|
| | | 23.3° C. ft-lb/inch | −28.8° C. | | |
| 9 | 100:0 | 23.3 | 1.14 | 68 | (68) |
| 10 | 80:20 | 20.2 | 1.31 | 71 | (76) |
| 11 | 60:40 | 13.3 | 1.38 | 74 | (80) |
| 12 | 40:60 | 10.8 | 1.62 | 81 | (87) |
| 13 | 20:80 | 5.8 | 1.36 | 91 | (98) |
| 14 | 0:100 | 4.0 | 1.1 | 97.5 | (103) |

*Weight Ratio of PVC to Vinyl Polymer B = 60:40

EXAMPLES 15-20

Blends of Vinyl Polymer B, B-221 PVC resin (Occidental Chemical Corporation) and SMA Polymer III were prepared in proportions covering the entire binary composition range using the above described procedures. The notched izod impact strengths and heat distortion temperatures of these blends were measured using the procedures described in Table 1. The results are shown in Table 5.

TABLE 5

| Example No. | Composition Vinyl Polymer*:SMA Polymer III | Notched Izod Impact Strength at | | Heat Distortion Temperature annealed (264 psi) 48 Hrs. at 50° C. (24 Hrs. at 70° C.) °C. | |
|---|---|---|---|---|---|
| | | 23.3° C. ft-lb/inch | −28.8° C. | | |
| 15 | 100:0 | 23.3 | 1.14 | 68 | (68) |
| 16 | 80:20 | 3.7 | 0.93 | 71 | (77) |
| 17 | 60:40 | 3.4 | 1.02 | 74 | (80) |
| 18 | 40:60 | 4.5 | 1.12 | 80 | (86) |
| 19 | 20:80 | 4.7 | 0.85 | 86 | (95) |
| 20 | 0:100 | 4.6 | 0.8 | 89 | (98) |

*Weight Ratio of PVC to Vinyl Polymer B = 60:40

EXAMPLES 21-25

SMA Polymer I was blended with Vinyl Polymer B in proportions shown in Table 6 in accordance with the above-described procedures. The heat distortion temperatures and the notched izod impact strengths of these blend compositions were tested as described in Table 1. Table 6 shows the results of these measurements.

TABLE 6

| Example No. | Composition SMA Polymer I:Vinyl Polymer B | Notched Izod Impact Strength at | | Heat Distortion Temperature annealed (264 psi) 48 Hrs. at 50° C. (24 Hrs. at 70° C.) °C. | |
|---|---|---|---|---|---|
| | | 23.3° C. ft-lb/inch | −28.8° C. | | |
| 21 | 100:0 | 5.4 | 1.4 | 89.8 | (97) |
| 22 | 90:10 | 5.4 | 1.46 | 85 | (95) |
| 23 | 80:20 | 8.7 | 1.9 | 82 | (95) |
| 24 | 70:30 | 11.6 | 2.3 | 81 | (92) |
| 25 | 60:40 | 13.4 | 2.7 | 79 | (89) |

*Weight Ratio of PVC to Vinyl Polymer B = 60:40

EXAMPLES 26-30

Blends of Vinyl Polymer B with SMA Polymer III were prepared using the above described procedures. The properties of these compositions were measured using the procedures described in Table 1. The results are shown in Table 7.

TABLE 7

| Example No. | Composition SMA Polymer III:Vinyl Polymer B | Notched Izod Impact Strength at | | Heat Distortion Temperature annealed (264 psi) 48 Hrs. at 50° C. (24 Hrs. at 70° C.) °C. |
|---|---|---|---|---|
| | | 23.3° C. | −28.8° C. | |
| | | ft-lb/inch | | |
| 26 | 100:0 | 4.6 | 0.8 | 89 (98) |
| 27 | 90:10 | 3.7 | 1.11 | 87 (95) |
| 28 | 80:20 | 4.2 | 1.14 | 84 (96) |
| 29 | 70:30 | 5.7 | 1.22 | 82 (92) |
| 30 | 60:40 | 5.3 | 1.49 | 79 (88) |

EXAMPLES 31–34

Vinyl Polymer B was blended with SMA Polymer I and B-221 PVC resin (Occidental Chemical Corporation). The proportions are indicated in Table 8. 55-gram samples of each blend were dried and tested by Brabender Torque Rheometer. The results are shown in Table 8.

TABLE 8

Brabender Torque Rheometer Data

| | Example No. | | | |
|---|---|---|---|---|
| | 31 | 32 | 33 | 34 |
| Vinyl Polymer*:SMA Polymer I | 80:20 | 60:40 | 40:60 | 20:80 |
| Ram Pressure (grams) | 7500 | 7500 | 7500 | 7500 |
| R.P.M. | 63 | 63 | 63 | 63 |
| Max Fusion Peak (seconds) | 16.2 | 23.2 | 15.8 | 20.8 |
| Max Fusion Torque (meter-grams) | 3800 | 6000 | 6350 | 8000 |
| Equilibrium Torque (meter-grams) | 800 | 1170 | 1200 | 1300 |
| Decomposition (minutes) | 6.4 | 10.3 | 9.3 | 10.2 |
| Stock Held @ (°F.) | 400 | 400 | 400 | 400 |

*Weight Ratio of PVC to Vinyl Polymer B = 60:40

EXAMPLES 35–38

Vinyl Polymer B was blended with SMA Polymer I in the proportions indicated in Table 9. 55-gram samples of each blend were dried and tested by Brabender Torque Rheometer. The results of these tests are shown in Table 9.

TABLE 9

Brabender Torque Rheometer Data

| | Example No. | | | |
|---|---|---|---|---|
| | 35 | 36 | 37 | 38 |
| SMA Polymer I:Vinyl Polymer B | 90:10 | 80:20 | 70:30 | 60:40 |
| Ram Pressure (grams) | 7500 | 7500 | 7500 | 7500 |
| R.P.M. | 63 | 63 | 63 | 63 |
| Max Fusion Peak (seconds) | 21.0 | 20.8 | 28.2 | 23.8 |
| Max Fusion Torque (meter-grams) | 6250 | 7800 | 6150 | 5400 |
| Equilibrium Torque (meter-grams) | 1350 | 1500 | 1500 | 1500 |
| Decomposition (minutes) | >30 | 21.7 | 24.5 | 23.1 |
| Stock Held @ (°F.) | 400 | 400 | 400 | 400 |

EXAMPLES 39–42

Vinyl Polymer B was blended with SMA Polymer III in different proportions shown in Table 10. These blend compositions were dried and 55 gram samples of these materials were tested using a brabender Torque Rheometer. The results are shown in Table 10.

TABLE 10

Brabender Torque Rheometer Data

| | Example No. | | | |
|---|---|---|---|---|
| | 39 | 40 | 41 | 42 |
| SMA Polymer III:Vinyl Polymer B | 90:10 | 80:20 | 70:30 | 60:40 |
| Ram Pressure (grams) | 7500 | 7500 | 7500 | 7500 |
| R.P.M. | 63 | 63 | 63 | 63 |
| Max Fusion Peak (seconds) | 18.2 | 23.2 | 31.2 | 27.4 |
| Max Fusion Torque (meter-grams) | 6220 | 7050 | 6550 | 6100 |
| Equilibrium Torque (meter-grams) | 1150 | 1500 | 1200 | 1200 |
| Decomposition (minutes) | >30 | >30 | >30 | >30 |
| Stock Held @ (°F.) | 400 | 400 | 400 | 400 |

EXAMPLES 43–47

SMA Polymer IV was blended with Vinyl Polymer B in various proportions covering the binary composition range. The heat distortion temperatures and notched izod impact strengths of these blend compositions were measured using procedures described in Table 1. The results are shown in Table 11.

TABLE 11

| Example No. | Composition SMA Polymer IV:Vinyl Polymer B | Notched Izod Impact Strength at | | Heat Distortion Temperature annealed (264 psi) 48 Hrs. at 50° C. (24 Hrs. at 70° C.) °C. |
|---|---|---|---|---|
| | | 23.3° C. | −28.8° C. | |
| | | ft-lb/inch | | |
| 43 | 100:0 | 0.49 | 0.37 | 94 (101) |
| 44 | 90:10 | 0.57 | 0.21 | 92 (100) |
| 45 | 80:20 | 0.57 | 0.18 | 91 (99) |
| 46 | 70:30 | 0.67 | 0.25 | 89 (97) |
| 47 | 60:40 | 0.87 | 0.3 | 86 (95) |

EXAMPLES 48–52

SMA Polymer V was blended with Vinyl Polymer B. The proportions of these components are shown in Table 12. The properties of these blends were measured using methods described in Table 1. The results of these measurements are shown in Table 12.

TABLE 12

| Example No. | Composition SMA Polymer V:Vinyl Polymer B | Notched Izod Impact Strength at 23.3° C. ft-lb/inch | −28.8° C. ft-lb/inch | Heat Distortion Temperature annealed (264 psi) 48 Hrs. at 50° C. (24 Hrs. at 70° C.) °C. |
|---|---|---|---|---|
| 48 | 100:0 | 0.46 | 0.35 | 105 (108) |
| 49 | 90:10 | 0.38 | 0.24 | 98 (105) |
| 50 | 80:20 | 0.49 | 0.24 | 96 (104) |
| 51 | 70:30 | 0.79 | 0.29 | 93 (101) |
| 52 | 60:40 | 1.14 | 0.5 | 90 (98) |

EXAMPLES 53-58

Blend compositions having B-221 PVC resin (Occidental Chemical Corporation), SMA Polymer IV and Vinyl Polymer B were prepared in various proportions indicated in Table 3. The heat distortion temperatures and notched izod impact strengths of these blends were measured using methods described in Table 1. Table 13 lists the results of these tests.

TABLE 13

| Example No. | Composition Vinyl Polymer*:SMA Polymer IV | Notched Izod Impact Strength at 23.3° C. ft-lb/inch | −28.8° C. ft-lb/inch | Heat Distortion Temperature annealed (264 psi) 48 Hrs. at 50° C. (24 Hrs. at 70° C.) °C. | |
|---|---|---|---|---|---|
| 53 | 100:0 | 23.3 | 1.14 | (68) | 68 |
| 54 | 80:20 | 1.2 | 0.54 | (77) | 71 |
| 55 | 60:40 | 1.0 | 0.46 | (82) | 76 |
| 56 | 40:60 | 0.8 | 0.44 | (94) | 86 |
| 57 | 20:80 | 0.6 | 0.19 | (98) | 90 |
| 58 | 0:100 | 0.49 | 0.37 | (101) | 94 |

*Weight Ratio of PVC to Vinyl Polymer B = 60:40

EXAMPLES 59-62

SMA Polymer V was blended with Vinyl Polymer B and B-221 PVC resin (Occidental Chemical Corporation) in proportions shown in Table 14. 55-gram samples of these blend compositions were tested in Brabender Torque Rheometer. The results of these tests are shown in Table 14.

TABLE 14

| Brabender Torque Rheometer Data | | | | |
|---|---|---|---|---|
| | Example No. | | | |
| | 59 | 60 | 61 | 62 |
| Vinyl Polymer*:SMA Polymer V | 80:20 | 60:40 | 40:60 | 20:80 |
| Ram Pressure (grams) | 7500 | 7500 | 7500 | 7500 |
| R.P.M. | 63 | 63 | 63 | 63 |
| Max Fusion Peak (seconds) | 23.0 | 27.0 | 30.8 | 22.0 |
| Max Fusion Torque (meter-grams) | 4110 | 4980 | 5670 | 6870 |
| Equilibrium Torque (meter-grams) | 1050 | 990 | 1050 | 1200 |
| Decomposition (minutes) | 11.9 | 8.7 | 7.1 | 6.9 |
| Stock Held @ (°F.) | 400 | 400 | 400 | 400 |

*Weight Ratio of PVC to Vinyl Polymer B = 60:40

The foregoing examples illustrate that the blends of SMA polymers I II and III with the polyolefin graft polymers possess high notched impact strengths and high heat distortion temperatures. The blends of the vinyl halide polymer, the polyolefin graft polymer and SMA polymers I, II and III also have good impact strength and enhanced heat distortion temperatures. These blends also have good mechanical properties. Also, the blends of SMA polymers IV and V with the polyolefin graft polymer display high heat distortion temperatures.

We claim:

1. A polymer composition comprising:
a copolymer of a monovinyl aromatic compound and an anhydride of an ethylenically unsaturated dicarboxylic acid, and
a vinyl halide polyolefin graft polymer wherein the vinyl halide alone or in combination with up to 50 percent by weight based on the total weight of monomer of an ethylenically unsaturated compound copolymerizable therewith, and in the liquid state, is polymerized with a polyolefin which comprises a polymer of an aliphatic hydrocarbon monoolefin of 2 to about 8 carbon atoms, and which is in the solid state and is substantially insoluble in the monomer but absorbs a substantial amount of the monomer wherein the proportion of polyolefin in said graft polymer is greater than about 20 up to 80 weight precent based on the weight of the monomer.

2. The polymer composition of claim 1 wherein the vinyl halide is vinyl chloride.

3. A polymer composition comprising:
a copolymer of styrene and maleic anhydride, and
a vinyl chloride polyolefin graft polymer, wherein the vinyl chloride in the liquid state, is polymerized with a polyolefin which is in the solid state and comprises an ethylene propylene diene modified polymer that is substantially insoluble in vinyl chloride but absorbs a substantial amount of vinyl chloride,
wherein the proportion of polyolefin in said graft polymer is greater than about 20 up to about 80 weight percent based on the weight of vinyl chloride.

4. The polymer composition of claim 3 wherein the polyolefin comprises a mixture of an ethylene propylene diene modified polymer and a high density polyethylene.

5. The polymer composition of claim 4 wherein the polyolefin is present in a proportion of about 30 to 50 percent by weight.

6. The polymer composition of claim 3, wherein the copolymer comprises about 50 to 95 mole percent of styrene aromatic compound and 5 to 50 mole percent of said anhydride.

7. The polymer composition of claim 6, wherein the copolymer is modified with about 5 to 40 weight percent of a rubber based on the weight of copolymer and rubber.

8. The polymer composition of claim 7 wherein the rubber is selected from the group consisting of homopolymers of conjugated dienes, copolymers of said dienes with up to 50 weight percent of one or more monolefinically unsaturated monomers, ethylene-propylene-diene terpolymer rubbers, acrylate diene copolymer rubbers, and mixtures thereof.

9. The polymer composition of claim 3 wherein the copolymer comprises about 50 to 95 weight percent of monovinyl aromatic compound 5 to 30 weight percent of said anhydride and 0 to 20 weight percent of a copolymerizable monomer.

10. The polymer composition of claim 9 wherein the copolymer is modified with about 5 to about 25 percent by weight of a rubber having a glass transition temperature below 0° C. based on the weight of copolymer and rubber.

11. The polymer composition of claim 10 wherein the copolymer has blended therewith a composition comprising a graft copolymer of from 20 to 40% by weight of a monomer selected from the group comprising methyl methacrylate and acrylonitrile and 80 to 60% by weight of a vinyl aromatic monomer said copolymer being grafted onto from 10 to 60%, based on the weight of the composition, of a substrate rubber having a glass transition temperature below 0° C.

12. The polymer composition of claim 3 wherein the vinyl chloride graft polymer is present in a proportion of about 40 to about 60 weight percent based on the weight of the polymer components.

13. The polymer composition of claim 3 which also comprises polyvinyl chloride.

14. The polymer composition of claim 13 wherein the polymer of styrene and maleic anhydride is present in a proportion of about 20 to about 80 weight percent based on the weight of total polymer components, and the polyolefin graft polymer and polyvinyl chloride are present in a ratio of about 10 parts polyolefin graft polymer to 90 parts polyvinyl chloride to about 90 parts polyolefin graft polymer to 10 parts polyvinyl chloride.

* * * * *